Sept. 6, 1966  E. R. CZERLINSKY  3,271,667
METHOD OF DETERMINING THE DIELECTRIC CONSTANT
OF IRREGULARLY SHAPED CRYSTALS
Filed May 1, 1963

INVENTOR.
ERNEST R. CZERLINSKY
BY
ATTORNEYS

United States Patent Office 3,271,667
Patented Sept. 6, 1966

3,271,667
METHOD OF DETERMINING THE DIELECTRIC CONSTANT OF IRREGULARLY SHAPED CRYSTALS
Ernst R. Czerlinsky, Arlington, Mass., assignor to the United States of America as represented by the Secretary of the Air Force
Filed May 1, 1963, Ser. No. 277,403
6 Claims. (Cl. 324—58)

The invention described herein may be manufactured and used by or for the United States Government for governmental purposes without payment to me of any royalty thereon.

This invention relates to a method and apparatus for determining the characteristics of diamonds and the like, and more particularly, wherein a determination of the dielectric constant at microwave frequencies is achieved by utilizing microwave resonant cavities.

In the usual techniques for the determination of the dielectric properties of materials at microwave frequencies, specimens of required shape and size must be precisely machined. For example, in one technique a slab accurately machined to the waveguide cross-sectional dimensions is placed in the waveguide and the reflection coefficient is measured. In another technique small specimens are used, but the analysis of the experimental data (for example, the shift in resonance frequency of a cavity in which the specimen is placed) requires that the specimen be in shape of an ellipsoid. In practice, small spherical specimens are most often used, but needle or disc-shaped specimens are also reasonably acceptable approximations to ellipsoids. In any case specimen machining is also required.

The basic reason for this is that a dielectric specimen placed in an electromagnetic field has charges induced on its free surfaces and these modify the reaction of the specimen on the field in a manner that depends strongly on the specimen shape. The bulk dielectric properties of the material can only be deduced from the experimental data when the effect of the specimen shape has been taken into account theoretically. This is done automatically in the rigorous solution of Maxwell's equation for dielectric-filled waveguide for the first case described above. For small ellipsoidal specimens a theoretical approximation is employed. It is considered that the small specimen is immersed in a practically uniform microwave electric field. The situation then coincides with the electrostatic case and is rigorously soluble in terms of shape-dependent depolarizing factors which are tabulated in several publications.

In many practical cases, however, there is encountered the problem of making dielectric measurements on specimens of irregular shapes which cannot be machined or which should not be altered in shape. This occurs, for example, in the case of diamond crystals (or the like) which are typically small and almost unmachinable. The present invention permits microwave dielectric measure-means on materials of this type. The principle is based on the fact that the shape-dependent problems arise because of the existence of a surface across which the dielectric properties change discontinuously. If, instead of being immersed in air, the specimen is embedded in a medium of dielectric properties identical to its own, no effective surface changes would be induced by the R.F. field and the shape of the specimen would have no influence. In fact, such media are available with dielectric constants of almost any desired value. For example, polystyrene plastics containing powdered rutile ($TiO_2$) may be prepared in a controllable way to have any desired dielectric constant between 2.5 and, at least, 20. The forming of such materials occurs at relatively low temperatures so that there is little hazard of changing the properties of a specimen embedded therein. This hazard does exist, however, and must be considered in any specific case in making a choice of embedding medium. For measurements on diamond crystals the polystyrene-rutile plastics are perfectly safe.

In accordance with the present invention, there is prepared a series of rods of materials with known dielectric constants covering the range in which the material under investigation is believed to fall. These rods may be of a length equal to the height of a microwave resonant cavity and of a diameter such that the rod volume is sufficient to contain the specimen. Each of these rods is placed in the cavity and the resultant shift is noted. There is then successively embedded the specimen under study in each of these materials and there are prepared identical rods containing the specimen. The frequency shifts are again noted. For a certain value of dielectric constant of the material, identical frequency shifts will be observed with and without the specimen. This value is then the dielectric constant of the unknown specimen.

An object of the present invention is to provide a method to determine the dielectric constant of a diamond (or the like) at microwave frequencies.

Another object of the present invention is to provide a method for determining the dielectric constant of a diamond (or the like) at microwave frequencies wherein the resonant frequency shifts of a microwave cavity are measured when materials of known dielectric constant traversing the range of the diamond are inserted therein, then the resonant frequency shifts of the cavity where the same materials having the diamond embedded therein are inserted in the cavity is noted.

In the accompanying specification, I shall describe, and in the annexed drawings show, what is at present considered a preferred embodiment of my present invention. It is, however, to be clearly understood that I do not wish to be limited to the exact details herein shown and described as they are for the purposes of illustration only, inasmuch as changes therein may be made without the exercise of invention and within the true spirit and scope of the claims hereto appended.

Figure 1:
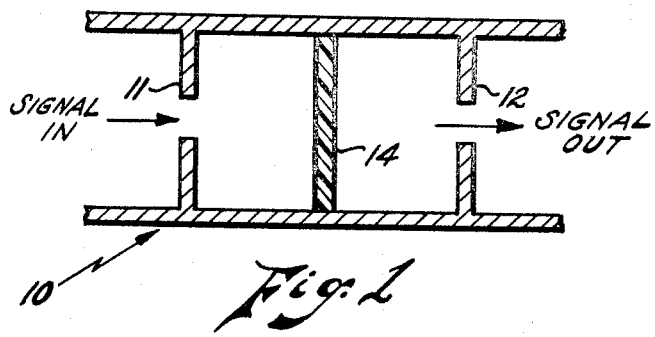
FIG. 1 shows a resonant microwave cavity including a specimen rod.

Now referring in detail to FIG. 1, there is shown a microwave cavity resonator 10 which is comprised of irises 11 and 12 respectively and rectangular waveguide 13. A cavity resonator of this type is convenient to make by placing two irises in a section of rectangular waveguide. This procedure also has the advantage of permitting the theoretical calculation of the size of irises required for a given loaded Q. This type of microwave cavity resonator is conventional and is such as shown and described at pages 653–661, vol. 9, of Radiation Laboratory Series published in 1948 by McGraw-Hill Co., Inc.

There is prepared a series of rods to be inserted into cavity resonator 10. These rods are in the form of a cylinder and of a length approximately equal to the height of rectangular waveguide 13 so that each rod may be easily pressure fitted into said cavity resonator at a position of maximum electric field at the center of the cavity.

The series of rods are prepared to have a dielectric constant range so that it would include that of the diamond to be measured. The diameter of the rod is made large enough so as to completely embed the diamond. It is to be noted that these rods are easily formed from suspensions of powdered rutile ($TiO_2$) in polystyrene plastic since these suspensions are commercially available at any prescribed value of dielectric constant between 2.5 and, at least, 20 with an accuracy of a few percent. The values, of course, may be checked by slotted-line techniques. The forming of these rods occurs at relatively low temperatures so that there is no hazard involved as to the diamond to be embedded therein. There is thus prepared a series of rods of materials with known dielectric constants covering the range in which the diamond under investigation is believed to fall. These rods are of length equal approximately to the height of the microwave resonant cavity and of a diameter such that the rod volume is sufficient to contain the diamond.

Figure 2:
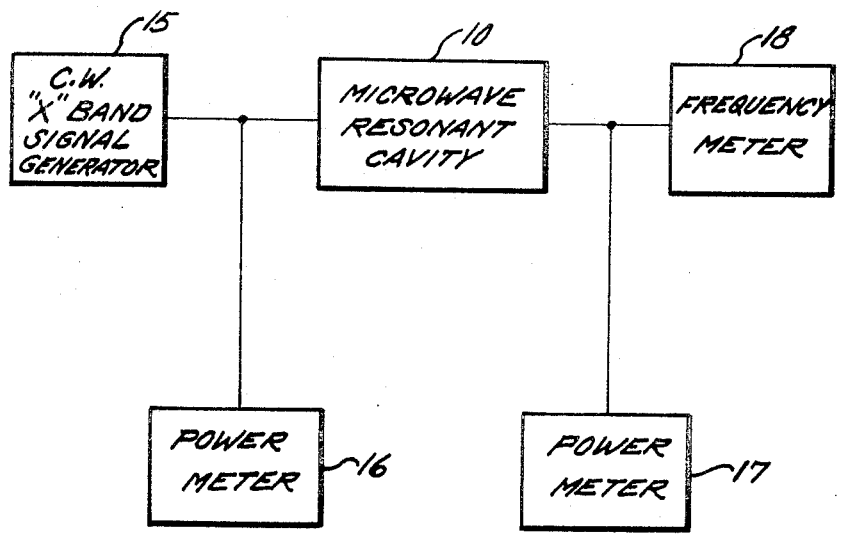
FIG. 2 shows a block diagram utilized in determining the dielectric constant of a diamond.

Now referring to FIG. 2, there is shown a system for measuring the frequency shift in a resonant cavity resulting from the successive insertion therein of various prepared rods. C.W. "X" band signal generator 15 is tuned to the dominant resonant frequency made of resonant cavity 10. Power meter 16 is utilized to insure constant input power to resonant cavity 10, and power meter 17 is utilized to ensure that resonant cavity 10 is operating at the aforementioned dominant resonant frequency mode. Frequency meter 18 is utilized to indicate the precise frequency at said dominant resonant frequency mode.

After the determination and notation have been made of the exact frequency at the dominant resonant frequency mode in resonant cavity 10, one of the series of prepared rods is inserted into cavity 10. Power meter 16 is checked to ensure that the input power has remained constant, and the reading of frequency meter 18 is noted. The difference between the two noted frequency readings is referred to as the resulting frequency shift. Each of the series of prepared rods are in this manner successively placed in cavity 10 and the resulting frequency shifts in each instance is noted. This resulting frequency shift is negative and is larger in magnitude the greater the dielectric constant of the cylindrical specimen. There is then embedded successively the diamond under study in the aforementioned suspension materials to form successive rods, each of the series have the identical dielectric constant as the respective rods of the first series. The resulting frequency shift in cavity 10 of each of the rods including the diamond is again noted, as previously. For a certain value of dielectric constant of the rod, identical frequency shifts are observed with and without the diamond therein. This value is then dielectric constant of the unknown diamond.

It is possible that the introduction of the diamond into the rods of two neighboring values of dielectric constant produces frequency shifts of opposite sign relative to those produced by the corresponding rods not containing the diamond. The dielectric constant of the unknown may then be achieved by interpolation.

It is to be additionally noted that in general the dielectric constant of a material is expressed as a complex number, the imaginary part corresponding to the existence of an R.F. loss mechanism. In my above-described invention, the loss term leads to an increase in the bandwidth of the cavity resonance. The "dielectric constant" which has been referred to previously is properly, the real part of the complex dielectric constant. The present invention is useful in measuring the loss properties of materials like diamonds. The matching of the real part of the dielectric constant to that of the embedding medium assures that the R.F. field inside the specimen is very nearly the same as that in the rod alone. It is then possible to determine unambiguously the imaginary part of the dielectric constant from measuring the change of bandwidth of the cavity resonance. Thus the frequency shift in a resonant cavity is representative of the real part of a complex number thereby providing a method of determination of the dielectric constant and the change in bandwidth of the resonant cavity is representative of the imaginary part of the complex number and may be utilized to determine the loss.

In accordance therewith and referring to FIGURE 1, for each rod inserted into cavity 10, the bandwidth thereof is also noted. In the instance that the rod and the rod with an embedded diamond have approximately identical frequency shifts, there will be noted a change in bandwidth of cavity 10. This change in bandwidth is representative of the imaginary portion of the aforementioned complex number and is concurrently representative of the loss introduced by the embedded diamond.

There is thus provided a method for determining the dielectric constant and resistivity without electrical contacts at microwave frequencies of a crystal such as a diamond, or the like, which is irregularly shaped and which cannot and should not be machined or altered in any manner. An important consequence of this invention is that these microwave measurements give results which are independent of surface properties, and thus of the manner of surface preparation.

What is claimed is:

1. The method of determining at microwave frequencies the dielectric constant of a crystal such as a diamond comprising forming a first series of rods, each having a preselected dielectric constant, measuring the individual frequency shift resulting from the insertion of each of said rods in a microwave resonant cavity, embedding said crystal successively in a second series of rods identical in dielectric constant to said first series of rods, and measuring the frequency shift in said microwave resonant cavity resulting from the successive insertion of each of said second series of rods including said crystal into said microwave resonant cavity.

2. The method of determining at microwave frequencies the dielectric constant of a crystal such as a diamond comprising forming a first series of rods, each having a preselected dielectric constant, measuring the dominant resonant frequency of a microwave cavity, inserting successively each of said rods into said microwave cavity, measuring the shift in frequency in said microwave cavity resulting from each of said successive insertions, embedding said crystal in a second series of rods having the identical dielectric constants as said first series of rods, inserting successively into said microwave cavity each rod of said second series of rods upon said embedding of said crystal therein, and measuring the frequency shift resulting from the insertion into said cavity resonator of each rod of said second series.

3. The method of determining at microwave frequencies the dielectric constant of a crystal such as a diamond comprising preparing a first series of rods of materials with known dielectric constants covering the range in which said crystal falls, positioning successively each of said first series of rods in a microwave resonant cavity, measuring the resultant frequency shift in the cavity resonant frequency for each rod of said first series, embedding successively said crystal in a second series of rods having the identical dielectric constants as said first series of rods, positioning successively each of said second series of rods with said diamond embedded therein into said microwave resonant cavity, and measuring the resultant frequency shift in the cavity resonant frequency for each rod of said second series.

4. A method of determining at microwave frequencies the dielectric constant of a crystal such as a diamond as in claim 3 wherein said materials utilized to prepare said rods is comprised of a preselected quantity of powdered rutile suspended in polystyrene plastic for each of said rods.

5. A method of determining at microwave frequencies the dielectric constant of a crystal such as a diamond as in claim 3 wherein each of said rods is positioned in said microwave cavity at the point of maximum electric field.

6. The method of determining at microwave frequencies the dielectric constant and loss of a crystal such as a diamond comprising preparing a first series of rods of materials with known dielectric constants covering the range in which said crystal falls, positioning successively each of said first series of rods in a microwave resonant cavity, measuring the resultant frequency shift and bandwidth in said resonant cavity caused by the insertion of each rod of said first series, embedding successively said crystal in a second series of rods having identical dielectric constants as said first series of rods, positioning successively each of said second series of rods with said diamond embedded therein into said microwave resonant cavity, measuring the resultant frequency shift and bandwidth in said resonant cavity for each rod of said second series, and determining the rod in said first series having the identical frequency shift as a rod in said series.

References Cited by the Examiner

Journal of Applied Physics, vol. 21, No. 10, October 1950, "Microwave Techniques for the Measurement of the Dielectric Constant of Fibers and Films of High Polymers," pp. 956–961.

The Review of Scientific Instruments, vol. 25, No. 9, September 1954, "A Method for Measuring the Dielectric Constant of Solids at Ultra High Frequencies," pp. 925–926.

The Marconi Review, vol. XXII, No. 134, 3d Quarter 1959, "Apparatus for the Measurement of Tensor Permeability and Dielectric Properties of Ferrites at X-Band Frequencies," pp. 154–162.

A. E. RICHMOND, *Assistant Examiner.*

WALTER L. CARLSON, *Primary Examiner.*